United States Patent
Jain et al.

(10) Patent No.: US 10,524,346 B2
(45) Date of Patent: Dec. 31, 2019

(54) DEVICE FOR TUNING SCRF CAVITY

(71) Applicant: THE SECRETARY, DEPARTMENT OF ATOMIC ENERGY, Mumbai, Maharashtra (IN)

(72) Inventors: Vikas Kumar Jain, Madhya Pradesh (IN); Girdhar Mundra, Madhya Pradesh (IN); Satish Chandra Joshi, Madhya Pradesh (IN); Parshotam Dass Gupta, Madhya Pradesh (IN)

(73) Assignee: The Secretary, Department of Atomic Energy, Mumbai, Maharashtra (IN)

( * ) Notice: Subject to any disclaimer, the term of this patent is extended or adjusted under 35 U.S.C. 154(b) by 269 days.

(21) Appl. No.: 15/022,358

(22) PCT Filed: Mar. 2, 2015

(86) PCT No.: PCT/IB2015/051517
§ 371 (c)(1),
(2) Date: Mar. 16, 2016

(87) PCT Pub. No.: WO2016/139504
PCT Pub. Date: Sep. 9, 2016

(65) Prior Publication Data
US 2017/0006695 A1    Jan. 5, 2017

(51) Int. Cl.
  *H05H 7/02* (2006.01)
  *H02N 2/02* (2006.01)
  *H02N 2/04* (2006.01)
  *H05H 7/20* (2006.01)
  *H05H 7/22* (2006.01)

(52) U.S. Cl.
  CPC ............... *H05H 7/02* (2013.01); *H02N 2/02* (2013.01); *H02N 2/04* (2013.01); *H05H 7/20* (2013.01); *H05H 7/22* (2013.01)

(58) Field of Classification Search
  CPC .. H05H 7/02; H05H 7/20; H05H 7/22; H02N 2/02; H02N 2/04
  USPC ........................................................ 310/328
  See application file for complete search history.

(56) References Cited

U.S. PATENT DOCUMENTS 6,657,515 B2    12/2003    Pappo et al.
2002/0190670 A1    12/2002    Pappo et al.

OTHER PUBLICATIONS

International Search Report and Written Opinion for International Patent Application No. PCT/IB2015/051517, dated Oct. 7, 2015.
(Continued)

*Primary Examiner* — Derek J Rosenau
(74) *Attorney, Agent, or Firm* — Merchant & Gould P.C.

(57) ABSTRACT

The present invention relates to method and device invention made in SS316LN for tuning single-cell or multi-cell SCRF cavity for precise slow and fast tuning with low hysteresis. The tuning mechanism (device) for SCRF cavity consists of two thick square flanges connected to each other through two parallel sets of X-link levers pivoted in between such that the motion of top end of flange and bottom end of flange equalizes; wherein the top end of X-link connects one square flange to the bottom end of the other square flange and vice-versa using thin flat flexure plates; wherein the flexure plates are joined on X-link and square flange by bolts having spring locks; the square flanges have platform on the top that transfer motion and these are connected through power screw mechanism; wherein the power screw for linear actuation is rotated using worm-wheel.

24 Claims, 9 Drawing Sheets

(56) References Cited

OTHER PUBLICATIONS

A. Bosotti et al.: "The Coaxial Blade Tuner—Final Report and Evaluation of Operation", SRF, 2008, 56 pages.
C. Pagani et al.: "ILC Coaxial Blade Tuner", Proceedings of EPAC06 Edinburgh Scotland, Jul. 2006 (Jul. 2007), pp. 466-468, XP002745137.
N. Solyak et al.: "SRF Cavity Tuning for Low Beam Loading", Proceedings of SRF 2013 Paris France, Feb. 2014 (Feb. 2014), pp. 1110-1114, XP002745138.
V. Kashikhin et al.: "Electromagnetic SCRF Cavity Tuner", Proceedings of PAC09 Vancouver Canada, Dec. 2010 (Dec. 2010), pp. 262-264, XP002745139.
T. Higo et al.: "Test Operation of Ball-Screw-Type Tuner for Low-Loss High-Gradient Superconducting Cavity at 77K", Proceedings of PAC07 Albuquerque New Mexico USA, Aug. 2007 (Aug. 2007), pp. 2104-2106, XP002745140.

DEVICE FOR TUNING SCRF CAVITY

This application is a National Stage Application of International Application No. PCT/IB2015/051517, filed 2 Mar. 2015 and which application is incorporated herein by reference. To the extent appropriate, a claim of priority is made to the above disclosed application.

TECHNICAL FIELD OF THE INVENTION

The present invention relates to a tuning system for superconducting RF (SCRF) cavity of accelerator. More particularly, the invention relates to X-link tuning device for single-cell or multi-cell superconducting radio frequency (SCRF) cavity for precise slow and fast tuning with low hysteresis.

BACKGROUND OF THE INVENTION

Particle accelerators using Linear Accelerators (LINACs) use superconducting niobium cavities to accelerate particles Niobium cavity enters into a superconductive state when it is cooled below the transient temperature (9.2 K) and the cavity is operated at cryogenic temperature using liquid helium (4.2 K) or superfluid helium (2K). A high frequency RF (radio frequency) power is coupled to the cavity using a suitable source and the charged particles are accelerated using this electromagnetic field. The cavity is tuned to RF frequency such that the cavity RF resonance frequency matches to the carrier RF supply frequency for transmitting of RF power to the charged particles. If the cavity is not in a resonating state with the RF source it would lead to reflect electromagnetic power to the source. The RF resonating frequency of the cavity depends on its physical dimensions, hence the cavity has to be expanded or compressed along the axis for optimal tuning within elastic limit. Thus, tuning mechanism is needed to maintain the efficiency of this system. Small deviations from the resonant frequency can lead to severe losses in the energy which is ultimately effectively available for particle acceleration.

Tuner is an important part of any accelerator RF cavity for static and dynamic control of its electromagnetic frequency. Functioning of a tuner is precise in case of superconducting RF cavities, where the cavity is axially compressed or expanded for changing its RF resonance frequency. In case of the SCRF cavities, quality factor is very high ($Q_0 > 10^9$), hence it is required to have a precise control on cavity frequency to match the narrow resonance bandwidth of the order of few Hz for tuning. The main task of a tuner is to provide means to tune the cavity to its designed frequency and compensate for fast instabilities like Lorentz-force detuning (LFD), microphonics etc. Both slow and fast tuning options are required to do precise control of SCRF cavity frequency for static and dynamic loadings respectively. At present INFN blade tuner, KEK co-axial tuner, Saclay type end lever tuner etc. are currently used as tuning systems in many accelerators Laboratories around the world.

The existing systems have certain major drawbacks which are briefly described hereinafter. Hysteresis is a major problem with the existing designs of tuners and there is a constant need in this field to develop suitable tuning mechanisms having minimal hysteresis. In the current state of the art there is no such tuner design that exists which can work both as an end tuner and as a coaxial tuner. The existing tuner components are intricate in shape and their fabrication requires special machining and specially trained personnel. Tuner components require multiple welding joints for instance Blade tuner has approximately 200 joints. It is to be understood that with the increase in the number of welding joints, the method become more complex and costly. Furthermore axial as well as diametrical space requirements are high. This increases the cold mass dimensions in the cryomodule hence there is always a need for a compact device. Lastly the present tuning devices are costly. Therefore, from the disadvantages existing in the present tuning devices, it has been understood that the industry is in a demand of SCRF tuning device which is simple in construction and function and is also cost effective.

In U.S. Pat. No. 6,657,515 a tuning mechanism for a superconducting radio frequency particle accelerator cavity is disclosed, wherein the cavity comprises a number of axially aligned cells held by a frame, with at least one active cell that is axially stretchable to tune the resonant frequency of the cavity. The tuning mechanism comprises a lever arm having a center of rotation, one or more mechanical members coupling the lever arm to an active cell, and a motor adapted to move the lever arm, to thereby move the active cell through the mechanical members.

The article "The coaxial blade tuner-final report and evaluation of operation" by Bosotti et al. discloses about coaxial blade tuner based on the bending of the blades that deform from the rest position (slant of 15° respect to the central axis) to a different configuration producing an elongation (or a shortening) of the tuner itself. This deformation is generated by the rotation of the central rings with respect to the lateral ones. In order to reduce the relative rotation of the lateral rings to nearly zero, and to balance the torsional moments, the central rings rotate in opposite directions and the blades are assembled symmetrically with respect to the horizontal plane. The rotation of the central rings is obtained through an outer leverage that is directly moved by the stepping motor and, through a connecting plate, induces a displacement in opposite directions of the edges of the central rings.

In "Test operation of ball-screw-type tuner for low-loss high-gradient superconducting cavity at 77 K" by Higo et. al. the longitudinal movement of the cavity is realized by circumferential movement on a large worm wheel attached on a male screw. The slow tuning is performed by a worm gear driven by a pulse motor. This slow tuning part is mounted on a ring loosely coupled to helium vessel via twelve thin blades so that the slow tuner as a whole can be pushed fast by piezo actuator mounted on a helium vessel.

The prior art designs of the tuning systems have drawbacks that there exists no design which can work both as an end tuner or coaxial tuner, tuner components are intricate in shape and fabrication needs special machining, tuner components need multiple welding joints (e.g. Blade tuner has ~184 joints and modified blade tuner has ~nearly half of the number of joints). Further the axial as well as diametrical space requirement in the prior tuner devices is high which increases the cold mass dimensions in the cryomodule. There is always a need for a compact device.

Therefore, prior art in the said technical field presents a picture where there is a need for a more rugged and reliable tuning mechanism which can be fabricated at low cost and will have merits like low hysteresis, compact size and versatility.

The common elements or standard engineering elements used in existing X-link tuning device are geared motor and power screw for slow tuning movement and piezo or fast tuning actuator for rapid tuning movement. The use of these components in the present invention is optimized for better performance. The present invention consists of a tuning device for SCRF cavity, which is not only having low hysteresis but also cost effective. The presence of fast tuning system on the same actuating platform makes the device compact. The different components of the device are easy to fabricate and can easily be assembled. The geared motor of the driving mechanism is across the cavity axis, which can give accessibility to replace the motor in case of non-operation or failure of motor.

OBJECT OF INVENTION

The first and foremost object of the present invention is to overcome the limitations of the prior art.

One of the objects of the present invention is to develop a tuning mechanism for superconducting RF (SCRF) cavity used in particle accelerators.

Another object of the present invention is to regulate the axial deformation of the SCRF cavity within elastic limit for shifting its electromagnetic frequency of the desired accelerating mode to match with the radio frequency (RF) source frequency.

Another object of the present invention is to have a mechanism for reducing overall hysteresis in the complete tuning cycle.

Yet another object of the present invention is to compact the size of the tuner device.

It is further object of the present invention is to have a mechanism for extending operating flexibility in both compression and expansion whereby it can be operated in either compression or expansion modes without losing symmetry of movement with slow and fast tuning options from a single point or no load point.

It is an object of the present invention to have a tuner frame of the SCRF cavity by having less number of components and rigid frame which enhances the efficiency of motion transfer.

Yet another object of the present invention is to have a novel design for the tuning mechanism for eliminating welding joints and complex machining for fabrication of the tuning device.

Another object of the present invention is to increase the tuning range of the tuner for SCRF cavity.

Another object of the present invention is to have a mechanism for ease of replacement of motor in case of failure.

Further object of the present invention is to develop a tuning mechanism that reduces the cost of tuner for SCRF cavity.

These and other objects of the present invention will become readily apparent from the following detailed description read in conjunction with the accompanying drawings.

SUMMARY OF INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

The X-link tuning system is suitable for single-cell or multi-cell SCRF cavity for precise slow and fast tuning with low hysteresis. Flexural plate bending about neutral position allows symmetric compression-expansion or expansion-compression cycle. Use of non-magnetic, cryo-compatible and high strength SS316LN or similar material in tuning mechanism of SCRF cavity is done in the present invention with titanium vessel (helium vessel) without inducing thermal strains (due to cool-down to cryogenic temperature) on the SCRF cavity or helium vessel.

It is to be understood that the mechanism of the present invention can be operated in either compression or expansion modes without losing symmetry of movement with slow and fast tuning options. The compression and expansion modes of operation can be selected as desired by the user. The proposed tuning device can be designed as co-axial tuning system or as end tuning system. The proposed invention has compactness, modular assembly, and low hysteresis in complete tuning cycle.

Accordingly, in one aspect of the present invention there is provided a tuning device for superconducting radio frequency (SCRF) cavity, said device comprising:
at least two square flanges;
at least two sets of X-link levers;
at least four thin flat flexure plates for top side and four for bottom side;
one or more piezo actuator(s);
at least one motor assembly
at least one power screw assembly;
wherein said sets of X-link levers are pivoted substantially at the middle portion; and that the motor, piezo actuator and power screw assembly equalizing the motion of top end and bottom end of said square flange;
wherein said square flanges are connected to each other through said sets of X-link levers; and said thin flat flexure plates connects top end of said X-link levers with at least one square flange to the bottom end of the other square flange and vice-versa causing the linear movement from the top of the said tuning device to be transferred to the bottom leading to top to bottom load transfer;
thereby providing slow and/or any fast tuning setup to transfer the force required for fine as well as fast control of frequency of any SCRF cavity.

Furthermore the present invention increases the tuning range, eliminates welding joints and complex machining for fabrication, ease of replacement of geared motor of driving mechanism is obtained in case of failure and has reduced cost.

The X-link tuning system of the present invention is suitable for single-cell or multi-cell SCRF cavity for precise slow and fast tuning with low hysteresis. Flexural plate bending about neutral position allows symmetric compression-expansion or expansion-compression cycle. Use of non-magnetic, cryo-compatible and high strength SS316LN or similar material in tuning mechanism of SCRF cavity is done for the first time with titanium vessel (helium vessel) without inducing thermal strains (due to cool-down to cryogenic temperature) on the SCRF cavity or helium vessel.

To enable the invention to be more clearly understood and carried into practice reference is now made to the accompanying drawings in which like references denote like parts throughout the description.

BRIEF DESCRIPTION OF THE ACCOMPANYING DRAWINGS

FIG. 2(*a*) shows 3-D assembly of the mechanism

FIG. 2(b) depicts the exploded view of power screw assembly.

FIG. 7 (a) depicts driving mechanism assembly and part details.

FIG. 7 (b) shows the power screw holding and piezo clasping plate.

FIG. 7 (c) depicts the power screw mechanism.

FIG. 8 (a) illustrates tuning piezo or tuning actuator assembly for compression expansion cycle and part details.

FIG. 8 (b) illustrates tuning piezo or tuning actuator assembly for expansion compression cycle and part details.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Figure 1:
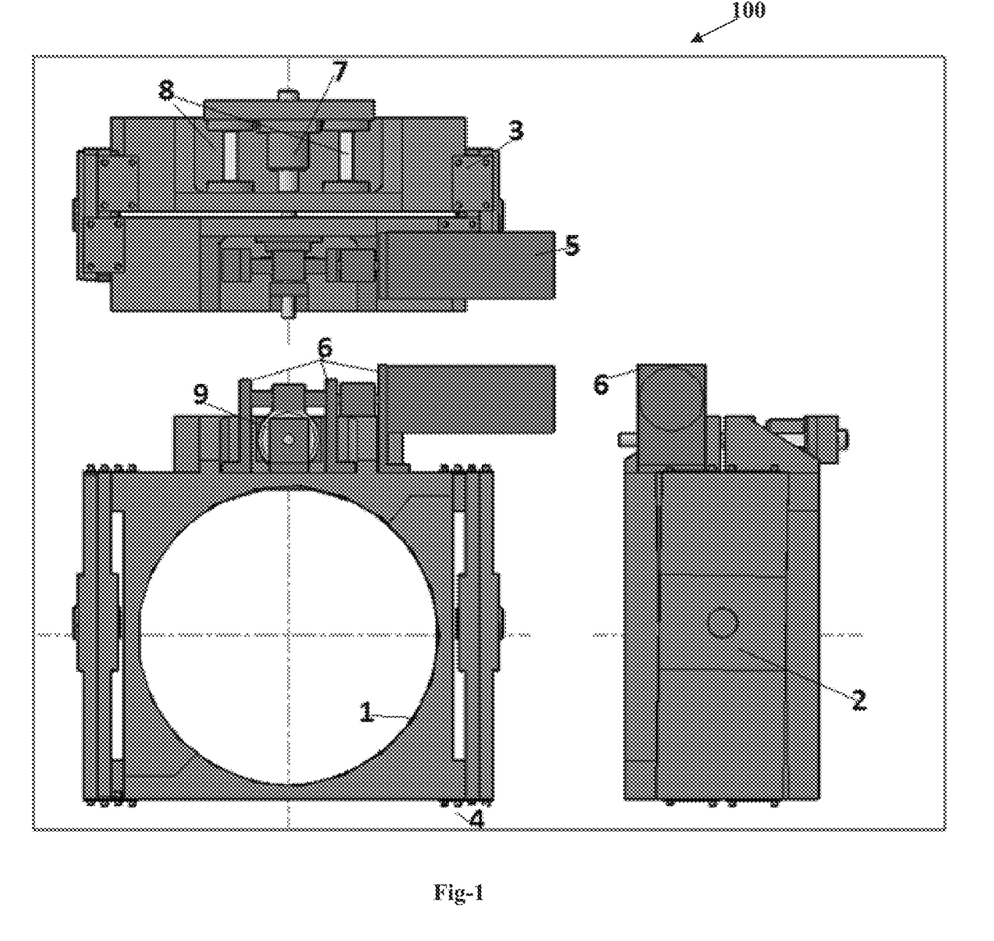
FIG. 1 illustrates assembly drawing of X-link tuning device.

FIG. 1 illustrates the assembly of the X-link tuning device (100). The said tuning device of the present invention comprises of a pair of square frames or flanges (1), which is used to attach the said tuning device (100) with the helium vessel (102) on both sides of the bellow on the SCRF cavity helium vessel. Furthermore the each square flange (1) is made in two parts and these parts are assembled using dwell pins and bolts having spring locks or suitable fasteners, the assemblies of square flanges (1) are connected to each other through a pair of parallel sets of X-link levers and bearings (2) which are pivoted substantially at the middle portions. The top end of X-link (2) connects one square flange to the bottom end of the other square flange and vice-versa using thin flexure plates (3). The flexure plates (3) bend about its neutral position thereby allowing symmetric compression-expansion or expansion-compression cycle.

Figure 7:
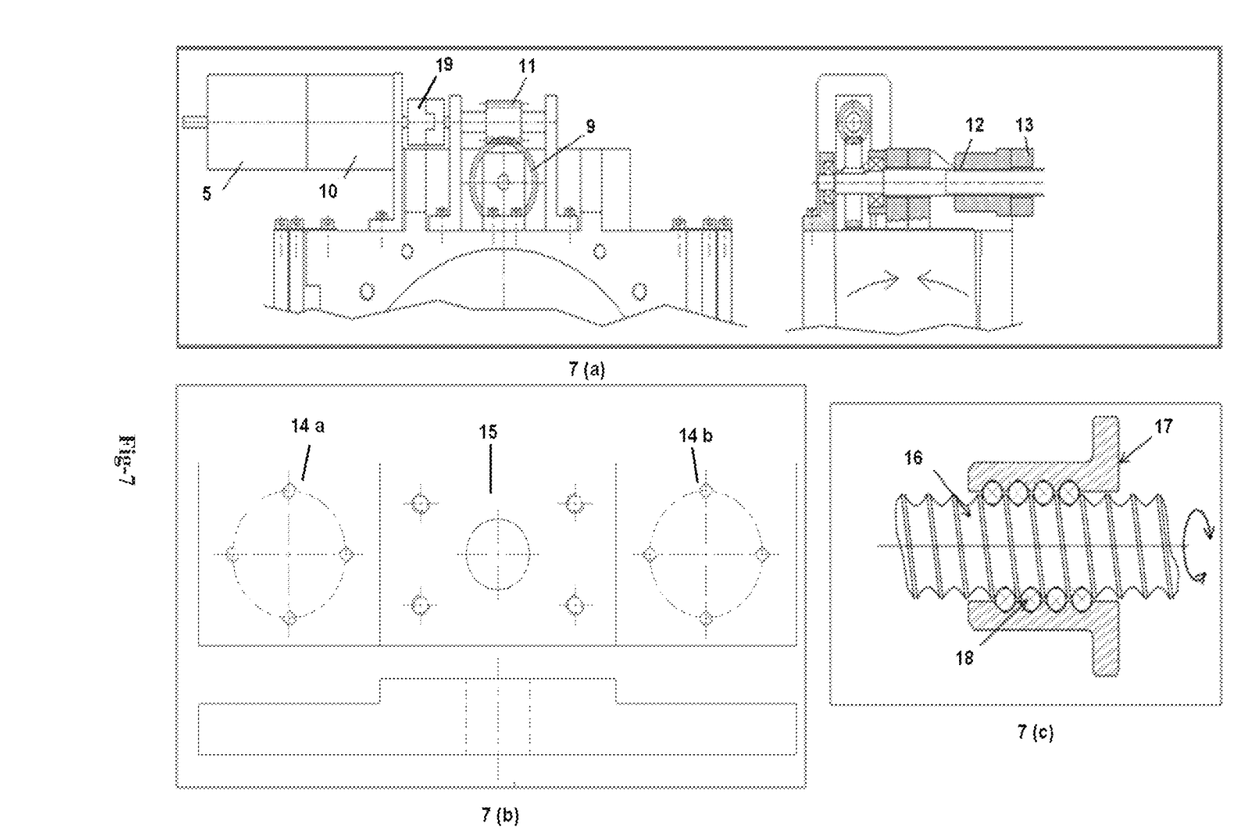

The flexure plates (3) are joined on X-link (2) and square flange (1) by bolts having spring locks, secured by Dwell Pins (4). The square flanges (1) have a platform on the top that transfers the linear motion to the rest of the tuning device (100) and these are connected together by way of a ball screw mechanism as depicted in FIG. 7. The ball type power screw mechanism is a main component of the linear actuation mechanism (7). The ball screw (also referred to as power screw) is rotated using a worm wheel (9) having a suitable reduction gear ratio by its worm gear (11). In an exemplary embodiment a gear ratio of 1:30 is used.

Furthermore one end of the worm gear (11) is supported on the top of one of the square frame and worm gear's (11) shaft is extended to connect to a cryo-compatible compact gear unit having large gear reduction ratio which is connected through a shaft coupling (19) as shown in FIG. 7. A cryo-compatible stepper motor (5) drives the said compact gear unit with range of 100 steps to 1000 or even more micro-steps in each motor rotation. The stepper motor shaft is extended on other side of the gear unit and suitable shaft coupling is made in order to have provision for coupling motor from outside the cryomodule assembly in case of motor failure during accelerator operation. The stepper motor (5) is used for tuning operations and is supported on the platform atop the square flanges (1) by way of a motor support (6) as depicted in FIG. 1. A pair of piezo actuators (8) is used for fast tuning operations.

Figure 2:
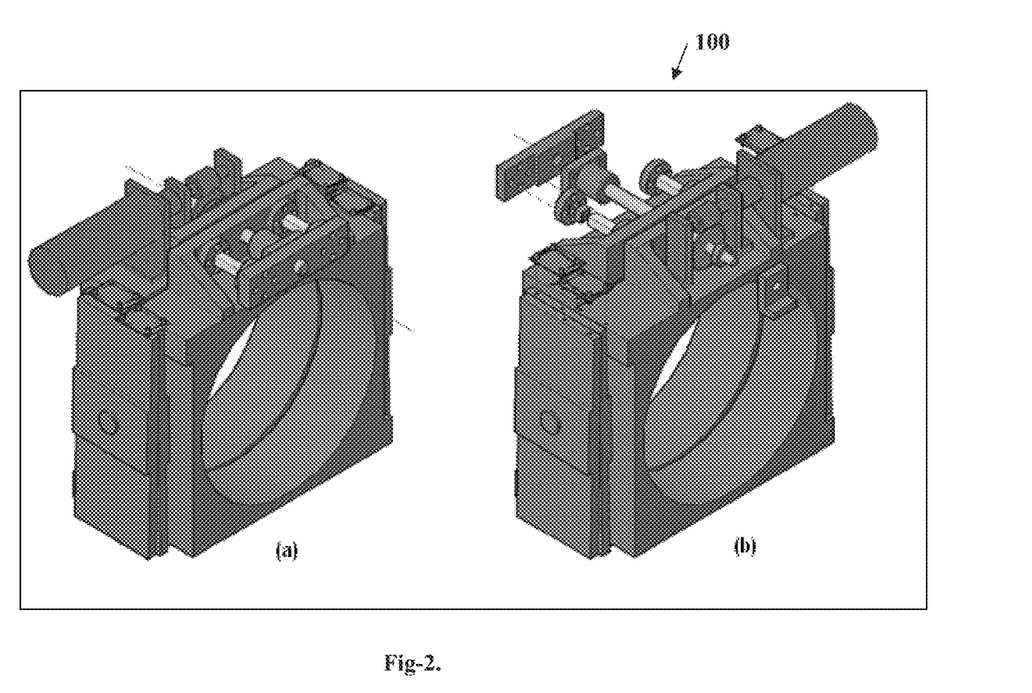

The FIG. 2 illustrates the three dimensional assembly of the tuning mechanism assembly (depicted as FIG. 2 (a)) and an exploded view (depicted as FIG. 2(b)) of the power screw assembly. The power screw assembly comprises of a power screw (12) and piezo clasping plate (13) (detail illustration in FIG. 7), a ball screw mechanism (detailed cross sectional profile view in FIG. 7(c)), piezo support flange (82) and piezo support guide (81) (detailed illustration in FIG. 8), a pair of piezo actuators (8) (detailed illustration in FIG. 8), a worm wheel (9) connected to the ball screw mechanism as shown in FIG. 7(c). The worm (11) is coupled to the worm wheel (9) for rotating the said wheel (9), the said worm (11) connected to a compact gear unit by way of a shaft (19) coupling, a stepper motor (5) capable of functioning in cryogenic environment is used for turning the compact gear unit, motor support (6) features for supporting the stepper motor (5) and the flexure plates (3) allowing for symmetric compression and expansion cycles. The power screw (12) assembly is used for linear actuation and connects the square flanges (1). The square flanges (1) are substantially thick such that its bending due to compression or expansion of the tuning device (100) is negligible.

Figure 3:
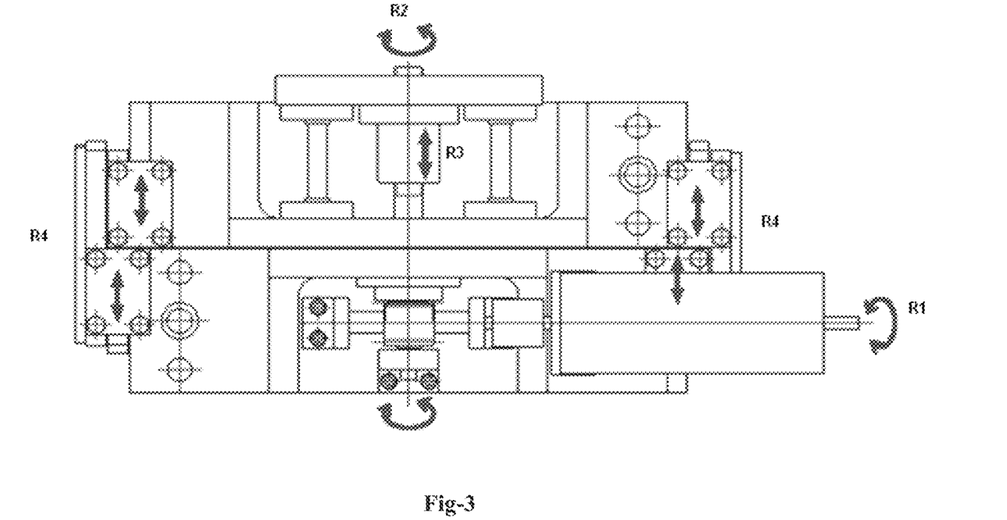
FIG. 3 depicts motion transfer schematic through stepper motor or DC motor.

The FIG. 3 illustrates by way of a schematic diagram the representation of the motion transfer to the rest of tuning mechanism through the stepper motor (5). The said stepper motor (5) is adapted to rotate (R1) the compact gear unit in both clockwise and anti-clockwise direction as depicted in FIG. 3. The gear unit is coupled to the aforesaid worm (11) by way of a shaft coupling (19). Hence the rotation (R1) of the compact gear unit causes the worm (11) also to rotate which in turn drives the worm wheel (9). The worm wheel (9) is coupled with the power screw (12) thereby causing the power screw (12) to rotate (R2). This leads to linear motion transfer through the pre-loaded piezos (R3). The arrangement of the flexure plates (3) and X-links (2) therefore causes the linear movement from the top of the tuning mechanism to be transferred to the bottom thereby leading to top to bottom load transfer as depicted as R4. The aforesaid arrangement can cause the tuning device to either expand or contract depending on whether the stepper motor (5) rotates in a clockwise or anticlockwise direction.

Figure 4:
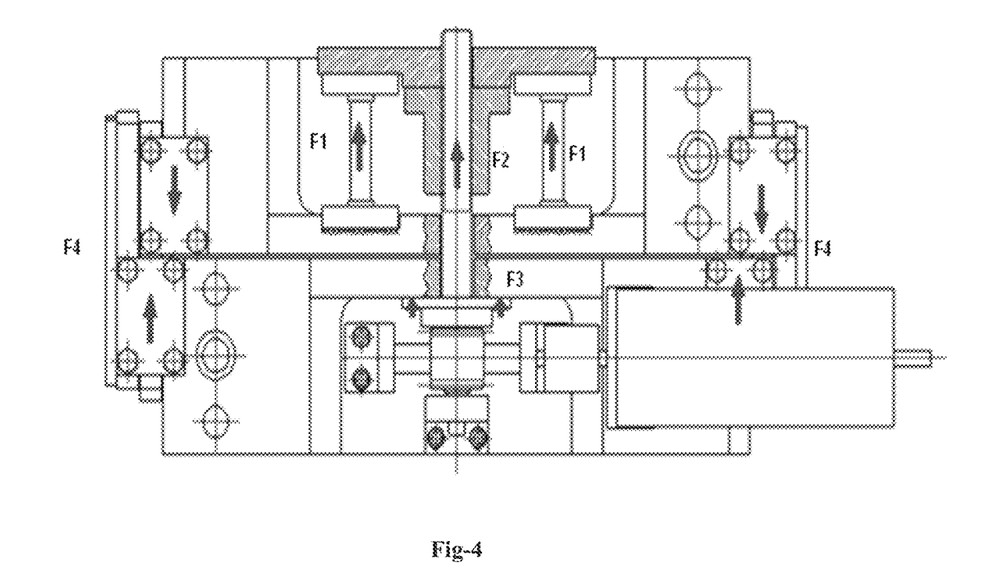
FIG. 4 illustrates motion transfer schematic through piezo or fast tuning actuator.

FIG. 4 illustrates by way of a schematic diagram the representation of the motion transfer to the rest of tuning mechanism through the piezo actuator (8). This mechanism can be essentially divided into four steps. Firstly piezo actuation (F1) results in exerting a force on the power screw (12) and piezo clasping plate (13). This leads to creating a linear drive motion (F2) through the power screw (12) and the aforesaid linear actuator mechanism. The transfer of the linear motion (F2) induces motion (F3) in the square frame or flanges (1). Finally movement (F4) of the flexural plates (3) and X-links (2) leads to transferring the load from top to bottom.

Figure 5:
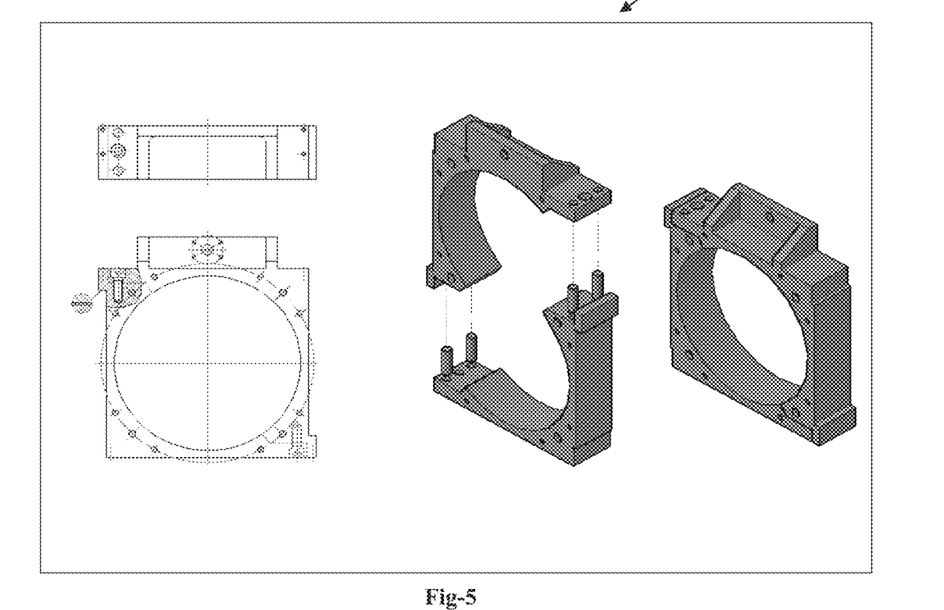
FIG. 5 illustrates the square frame assembly.

FIG. 5 illustrates the assembly of the square frame (1). The square frame (1) consists of two parts such that each part resembles a corner of a square shape and the said parts can be readily fit together. This is made in two parts to ensure plug compatibility i.e. to facilitate assembly of the tuner in already assembled cavity in cavity string. The assembled square frame has a circular cavity in between and a platform on top of the square flanges (1) for connecting the power screw (12).

Figure 6:
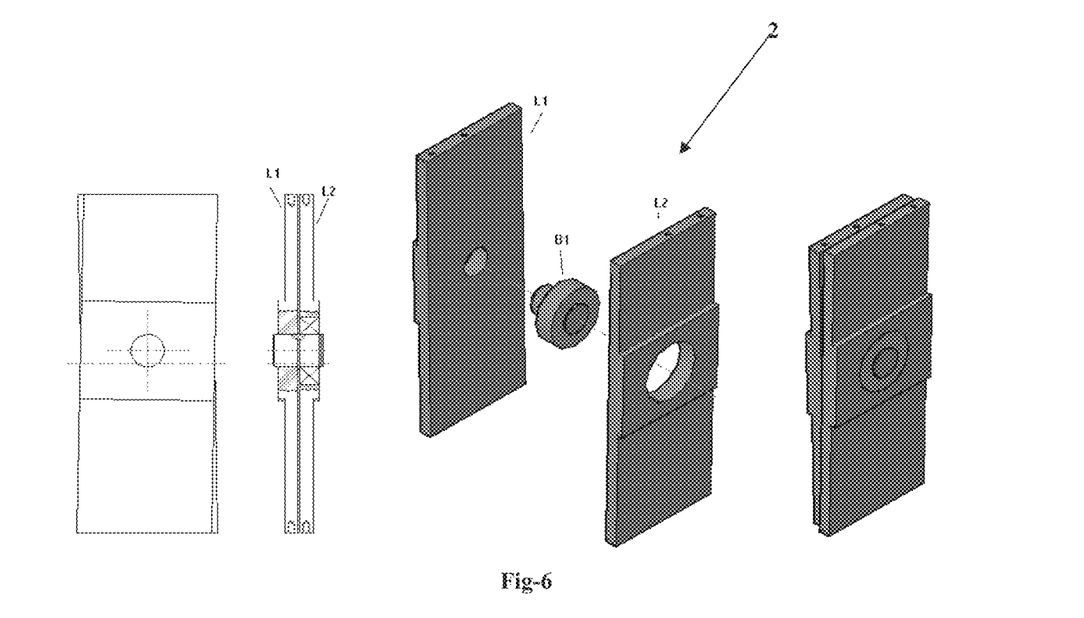
FIG. 6 shows X-link mechanism.

FIG. 6 illustrates the assembly of X-link lever and bearing (2) mechanism, and an exploded view thereof. The said X-link mechanism consists of two levers (L1, L2) arranged in a crossed position which are connected in the middle by way of a bearing (B1). The aforesaid square flanges (1) are connected to each other through two parallel sets of X-link levers (L1, L2) which are pivoted in between; wherein the top end of X-link connects one square flange to the bottom end of the other square flange and vice-versa using thin flexure plates (3); wherein the flexure plates (3) are joined on X-link and square flange by bolts having spring locks.

FIG. 7 illustrates the driving mechanism assembly and part details. The assembly of the driving mechanism comprises of a stepper motor (5), a compact gear box (10), a worm (11) coupled with a worm wheel (9), a ball screw mechanism and a power screw (12) and piezo clasping plate (13) as shown in FIG. 7(a). The detailed top view and front view of an exemplary embodiment of the said clasping plate (13) can be found in FIG. 7(a). The clasping plate (13) has provisions for attaching the power screw and the aforesaid piezo support flange (81) as shown in FIG. 7(b). The attachment for holding (15) clasping plate with power screw with bolts is depicted in FIG. 7(b). The piezo holding mechanism with bolts (14a, 14b) also is shown in more details in FIG. 7(b). An exemplary embodiment of the ball screw mechanism is also depicted in FIG. 7(c). The said ball screw mechanism is adapted for minimizing friction caused due to movement of the power screw shaft (16) by use of steel balls (18). The steels balls (18) are adapted in between nut (17) and power shaft (16) for minimizing friction as depicted in FIG. 7(c). This arrangement leads to low hysteresis due to rigid structure mechanism, use of ball type power screw (low stick-slip motion) has made the system with low friction and there is no friction in all the joints made by flexure plates joints (no stick slip motion).

Figure 8:
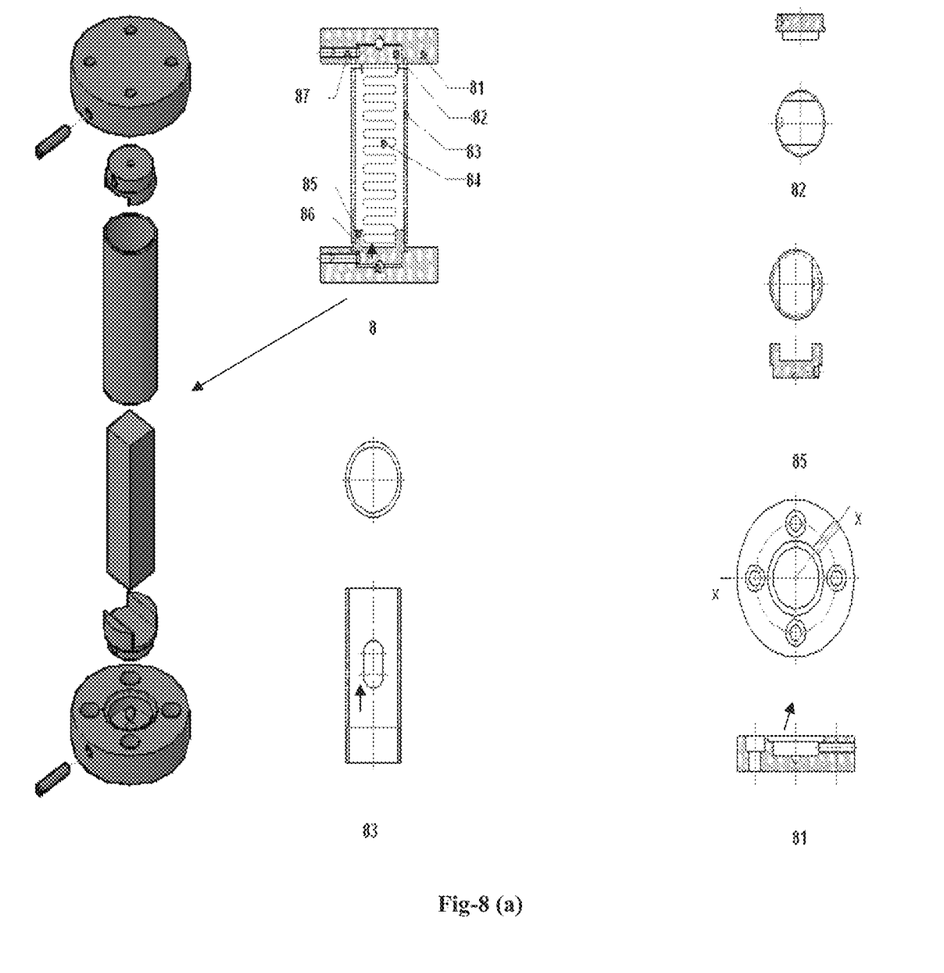
Figure 8B:
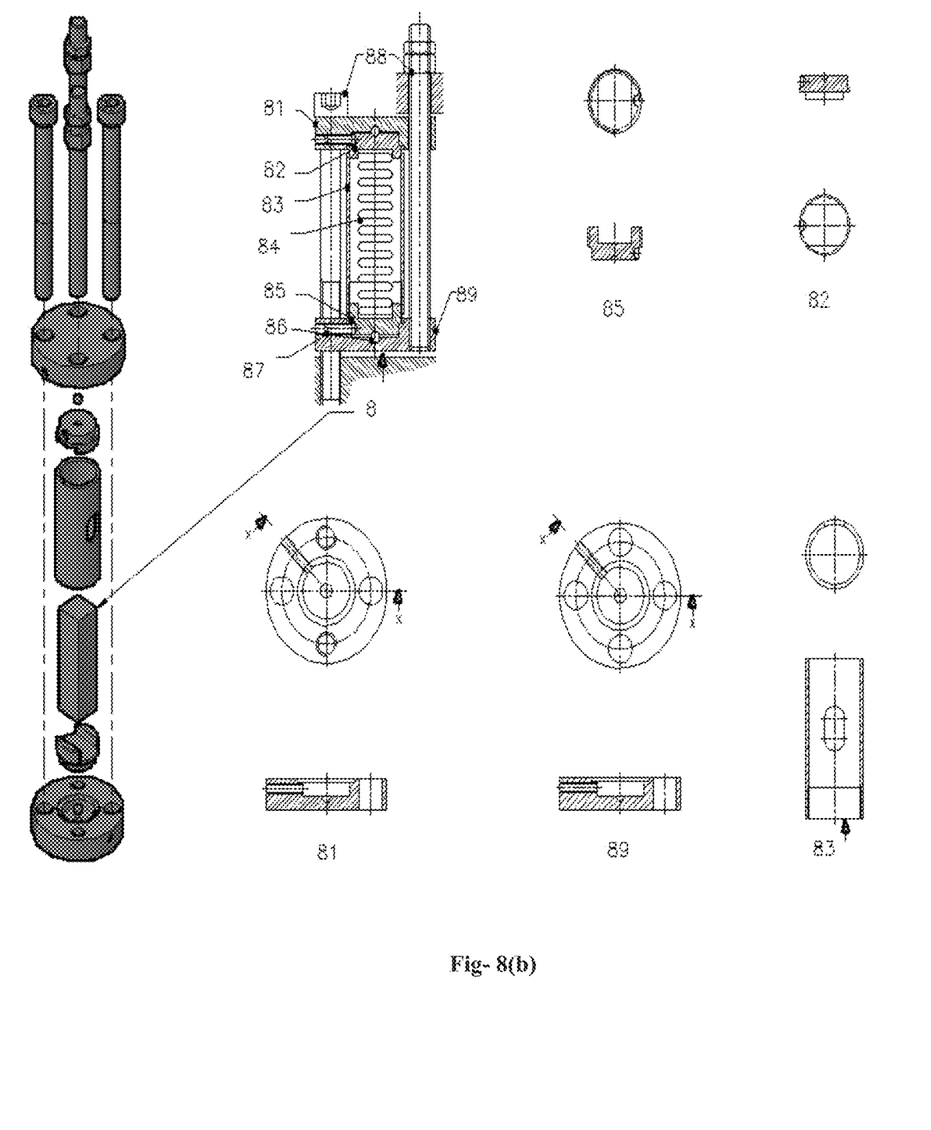

FIG. 8 illustrates the tuning piezo actuator (8) assembly and part details as per the scheme of tuning cycle. FIG. 8(a) is for compression-expansion tuning cycle arrangement and FIG. 8(b) is for expansion-compression tuning cycle arrangement. The said actuator assembly comprising of a piezo stack or fast tuning element (84), two piezo support flanges (82, 85), piezo support guides (81, 89), encapsulation tube (83), steel balls (86), grub screw (87) and fasteners (88) for assembly. Detailed front view and top view of the piezo support flange and piezo support guide are also given in FIG. 8.

Figure 9:
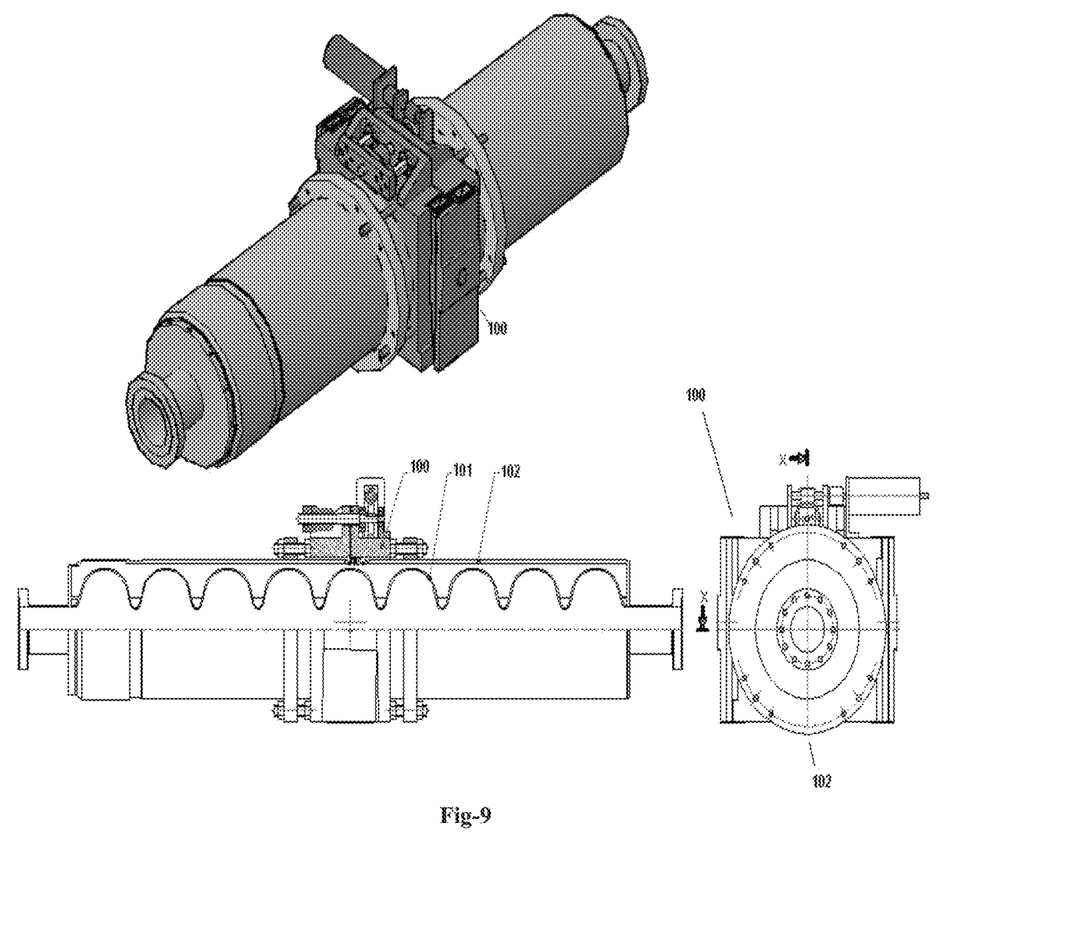
FIG. 9 shows X-link tuning device used as co-axial tuner.

FIG. 9 illustrates one of the embodiments of the present invention where the X-link tuning device (100) is used as co-axial tuner. FIG. 9 shows the different views of the X-link tuner device (100) mounted on the Helium vessel (102) as coaxial tuner. The side, top and isometric view of the X-link tuner device mounted on the helium vessel (102) is shown. The exemplary embodiment of mounted tuner device (100) as coaxial tuner in circular helium vessel (102) comprising SCRF cavity (101) is depicted herein.

Figure 10:
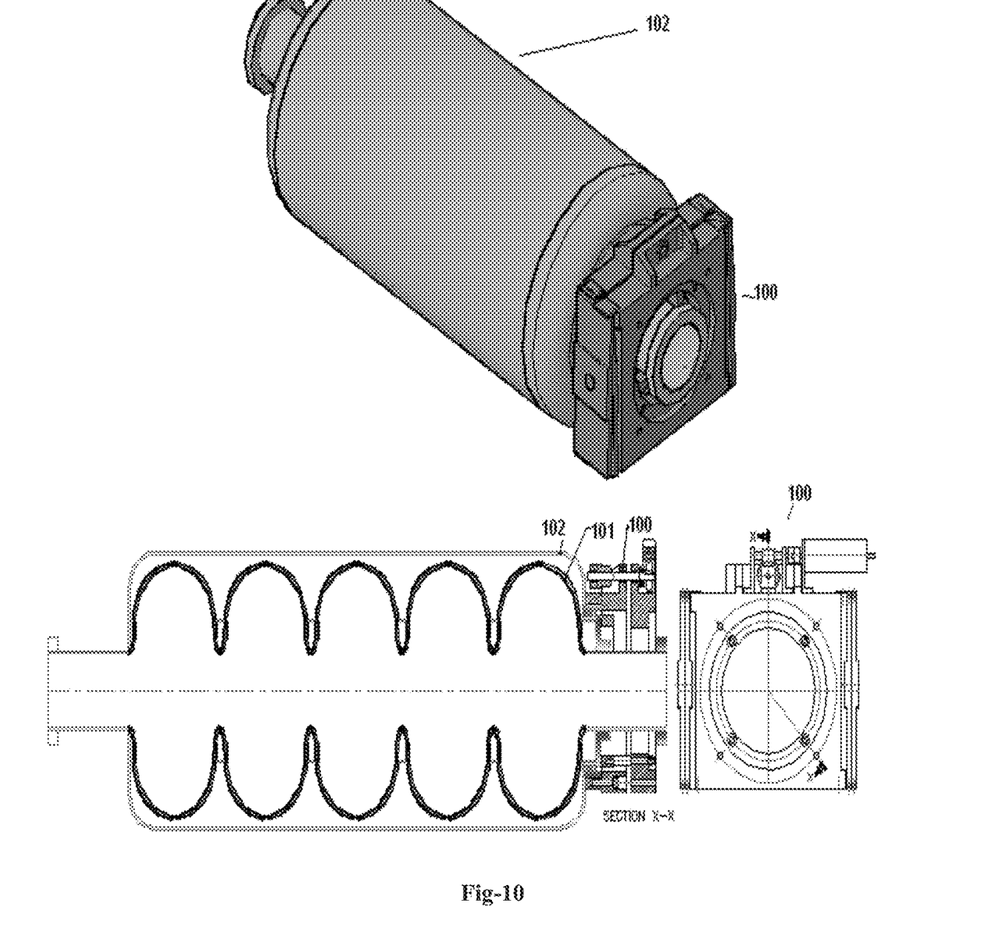
FIG. 10 illustrates X-link tuning device used as end tuner.

FIG. 10 illustrates the yet another embodiment of the present invention where the X-link tuning device (100) is used as end tuner. FIG. 10 shows the different views of the X-link tuner device (100) mounted on the Helium vessel (102) as end tuner. The side, top and isometric view of the X-link tuner device (100) mounted on the helium vessel (102) is shown. The exemplary embodiment of mounted tuner device (100) as end tuner in circular helium vessel (102) comprising SCRF cavity (101) is depicted herein.

The description of the preferred embodiment of the present invention is applicable for entire range of single-cell or multi-cell axi-symmetric shapes of RF cavities such as pillbox, elliptical, re-entrant, low-loss, spherical or suitably shaped RF accelerating structures etc. The person skilled in art can adapt the present tuner device to be suitably also apply the same for other shapes of RF cavity. Design adaptability with changes in RF cavity shape can be worked out easily and the only pivotal position of the lever (L1, L2) needs to be adjusted accordingly and hence the design of the square frame (1), drive mechanism, piezo mechanism and flexure system remains the same for all shapes for a particular RF cavity frequency.

Furthermore the mechanism of the tuner device (100) of the present invention is scalable for around 300 MHz to 1500 MHz range of RF frequency of an accelerator cavity. The use of cryo-compatible stainless steel, SS316LN, or similar material in the aforesaid mechanism is not only cost effective but also gives freedom to use off-the-shelf accessories/components (e.g. ball screws arrangement, coupling, worm of the worm wheel, fasteners etc.).

The piezo actuator (8) setup is used to transfer the force required for fast and fine control of frequency for tuning.

The aforesaid mechanism uses a ball screw assembly, in an exemplary implementation the pitch may be 4 mm or higher for partial rotation wherein partial rotation is defined as less then quarter rotation of the power screw for negligible backlash from driving mechanism with low frictional resistance. The person skilled in art may implement the same idea with different specification of the assembly like pitch and rotations and those are well obvious to a person skilled in art and should be understood to be well within the scope of the present invention. The above mechanism when used for slow tuning improves tuning capabilities to more than 1.5 mm at the cavity level with permissible strains in the flexure plates (3).

In the present invention the transfer of linear motion by way of stepper motor and piezo actuator the mechanism is adapted to provide flexibility to be operated in expansion as well as in compression. This mechanism can be used in compression-expansion cycle for tuning or it can be used in expansion-compression cycle as per the requirement of the RF cavity tuning i.e. if the SCRF cavity after cool-down to cryogenic temperature (2K or 4.2K) has a lower frequency than the targeted frequency, the mechanism can be used as expansion-compression or vice-versa.

The aforesaid mechanism can be advantageously designed as a co-axial tuning system or as an end tuning system as per the suitability of the superconducting RF cavity (101) space in the cryomodule. One design of a co-axial tuning system for an RF cavity diameter is applicable on other RF cavity having the double diameter RF cavity (i.e. half frequency of the RF cavity) as an end tuning system as shown in FIG. 10.

The mechanism components in their preferred embodiments are simple and easy in manufacturing. No welding is involved hence no distortions occur in the present mechanism and the joints are bolted and locked hence providing ease in assembly of the system. The joints of flexure plates, square flanges and X link levers are made with dwell pin and secured by suitable fasteners. The driving system of the present invention is straightforward, compact and easily demountable. The driving mechanism of the present invention can be modified either as parallel to the cavity axis or as perpendicular to the cavity axis.

The worth of this tuning system lies in finding innovative way out to biggest challenges in SC cavity tuners like cost and direct load transfer from the tuner frame to the helium vessel of the RF cavity. The less number of components and rigid frame enhances the efficiency of motion transfer. The X-link tuner made in non-magnetic SS316LN not only gives strength to the system but also makes the manufacturing simple and economic.

In one of the embodiment of the present invention the X-link tuner device of the present invention can be operated in compression mode without losing symmetry of movement with slow and fast tuning options from a single point or no load point.

In another embodiment of the present invention the X-link tuner device of the present invention can be operated in either expansion mode without losing symmetry of movement with slow and fast tuning options from a single point or no load point The present tuner device provides wider tuning range with low hysteresis is another salient feature of this mechanism e.g. tuning range of +/−1.5 mm with low hysteresis for 1300 MHz 9-cell cavity and/or 650 MHz 5-cell cavity is achieved.

The components of tuning device also can be dry-lubricated using $WS_2$ (Tungsten disulfide) or a suitable dry lubricant, which not only reduces the friction but also reduces wear, seizing and galling of components.

Yet in another embodiment of the present invention the design of the tuning device for SCRF cavities where the X-link tuner can perform both slow and fast tunings options simultaneously with low hysteresis. The use of SS316LN or any non-magnetic steel makes the tuner rigid, economic and easy for fabrication. Tuners in the SCRF cavities are one of the cost driving factors and as SCRF accelerator projects around the world are current technology for almost all high energy physics program, a reduction in cost of tuner will have a major effect on such project.

The invention will also be helpful to reduce the overall cost of the development of superconducting proton linac using SCRF cavities.

Main advantages of the X-link tuner of the present invention are:
  i. Low cost of system:—X-link tuner is an economical alternative to the SCRF cavity tuning system due to use of SS316LN, no welding and very less number and simple to manufacture components.
  ii. Lighter and Compact:—The design of tuner allowed an important weight reduction about 40% as compared to the blade tuner. The high compactness in dimensions ensures that shrinkage during cool down is less. This is a special technical feature of this device because it facilitates use of SS316LN components which was hitherto not possible in earlier tuner designs.
  iii. Ease of manufacturing and assembly:—The components of the device are easy to fabricate due to simple frame type design. The mechanism has less number of components hence assembly time is less.
  iv. Wider tuning range:—The mechanism adopted in this tuner improves the slow tuning range to more than 1.5 mm at the cavity level.
  v. Suitability in either compression or expansion:—The mechanism can be operated in either compression or expansion modes without losing symmetry and hence the RF cavity acceptance for manufacturing errors can be increased.
  vi. Fast tuning assembly is prepared such that it protects the piezo or fast tuning actuators from breaking during assembly and operation.
  vii. Force transfer points become same for slow and fast tuners.
  viii. Assembly with magnetic shielding is modular and hence easily demountable.
  ix. The tuner is made weld-free and easy to assemble.
  x. The geared motor of this mechanism can be made accessible from outside the cryomodule as the motor is mounted perpendicular to the cavity axis.
  xi. Force transfer through ball type power screw mechanism has following advantages
    a. It minimizes backlash, low friction, less stick slip and hence the device has overall low hysteresis and quicker response.
    b. Low friction of ball type power screw leads to low heat generation due to friction and low power requirement for the motor. Both of these leads to low heat load on cryogenics.

The invention qualifies to be adopted in a variety of other embodiments such modifications and alternatives obtaining the advantages and the benefits of the present invention will be apparent to those skilled in the art. All such modifications and alternatives will be obvious to a person skilled in art.

Although the description herein contains many specifics, these should not be construed as limiting the scope of the invention, but as merely providing illustrations of some of the embodiments of the invention. One of ordinary skill in the art will appreciate that elements and materials other than those specifically exemplified can be employed in the practice of the invention without resort to undue experimentation. All art-known functional equivalents, of any such elements and materials are intended to be included in this invention. Numerous variations, changes and substitutions may be made without departing from the invention herein.

We claim:

1. A tuning device for superconducting radio frequency (SCRF) cavity, said device comprising:
    at least two square flanges;
    at least two sets of X-link levers;
    at least four thin flat flexure plates provided at the top and bottom of said square flanges and said X-link levers for coupling said square flanges and said X-link levers with said thin flat flexure plates;
    one or more piezo actuator(s);
    at least one motor assembly
    at least one power screw assembly;
    wherein said sets of X-link levers are pivoted substantially at the middle portion; and
    that the motor, said piezo actuator and said power screw assembly equalizes motion acting on the top and bottom of said square flange;
    wherein said square flanges are connected to each other through said sets of X-link levers; and said thin flat flexure plates are connected to said X-link levers and said square flange causes the linear movement from the top of said tuning device to be transferred to the bottom, leading to top to bottom load transfer; thereby providing slow and/or fast tuning setup to transfer the force required for fine as well as fast control of frequency of the SCRF cavity.

2. The tuning device as claimed in claim 1, wherein said flexure plates are joined on said X-link levers and said square flange by dowel pins, in association with suitable fasteners.

3. The tuning device as claimed in claim 1, wherein said sets of X-link levers are substantially parallel to each other.

4. The tuning device as claimed in claim 1, wherein said square flanges are substantially thick such that its bending due to compression or expansion of said tuning device is negligible.

5. The tuning device as claimed in claim 1, wherein said piezo actuator comprises:
    at least a clasping plate;
    at least two support flanges;
    at least two support guides; and
    at least one piezo stack;
wherein said actuators exert force on the power screw assembly and said clasping plate leading to a linear drive motion through said power screw assembly.

6. The tuning device as claimed in claim 1, wherein said power screw assembly comprises:
    a ball screw mechanism;
    a worm wheel; and
    a worm gear
wherein said worm wheel is operated by a worm shaft and the worm wheel is connected to said ball screw mechanism; and
wherein said ball screw mechanism comprises a plurality of stainless steel balls, nut and said power screw.

7. The tuning device as claimed in claim 6, wherein said power screw has a pitch of around 4 mm or higher for partial rotation, wherein partial rotation is less than quarter rotation of the power screw corresponding to the tuning requirement.

8. The tuning device as claimed in claim 6, wherein said square flanges comprises a platform on the top that transfers motion and connected through said power screw assembly.

9. The tuning device as claimed in claim 6, further comprises a worm coupled to said worm wheel for rotating said worm wheel.

10. The tuning device as claimed in claim 6, wherein said power screw is rotated using said worm wheel with a reduction gear ratio of 1:30 for linear movement.

11. The tuning device as claimed in claim 10, further comprises a cryo-compatible compact gear unit, wherein the cryo-compatible compact gear unit has a reduction gear ratio.

12. The tuning device as claimed in claim 11, wherein one end of said worm is connected through a shaft coupling to said cryo-compatible compact gear unit.

13. The tuning device as claimed in claim 11, wherein said compact gear unit is driven by said motor assembly for fine resolution with the range of around 100 steps to 1000 steps in each motor rotation.

14. The device as claimed in claim 11, wherein said motor assembly is adapted to rotate said compact gear unit in both clockwise and anti-clockwise directions.

15. The device as claimed in claim 1 wherein said motor assembly comprising a stepper motor or a dc motor with an extended shaft, adapted for coupling the motor externally in case of motor failure.

16. The tuning device as claimed in claim 1, wherein the joints of said flexure plates, square flanges and X link levers are made with dowel pin and secured by fasteners.

17. The tuning device as claimed in claim 1, wherein said tuning device with a titanium vessel, is attached on both sides of a bellow on the SCRF cavity.

18. The tuning device as claimed in claim 1, wherein said tuning device is adapted for an entire range of single-cell or multi-cell axi-symmetric shapes of RF cavities such as pillbox, elliptical, re-entrant, low-loss, spherical or suitably shaped RF accelerating structures.

19. The tuning device as claimed in claim 1, wherein said tuning device is made of non-magnetic, cryo-compatible, high strength, and ultra high vacuum compatible material.

20. The tuning device as claimed in claim 1, wherein said fast tuning setup on top of said square flanges facilitates both slow and/or fast tuning setup with low hysteresis from said platform and reduces overall dimension of the device.

21. The tuning device as claimed in claim 1, wherein said tuning device is operable in compression-expansion cycle for tuning or in expansion-compression cycle as per the requirement of the RF cavity tuning.

22. The tuning device as claimed in claim 1, wherein said tuning device is demountable from the titanium vessel of the RF cavity.

23. The tuning device as claimed in claim 1, wherein the pivotal position of said X-link levers is adjustable to adopt said tuning device for different RF cavity shapes.

24. The tuning device as claimed in claim 1, wherein the drive motion of said tuning device is adaptable as parallel to the cavity axis or as perpendicular to the cavity axis.

* * * * *